Aug. 23, 1932.         F. G. SALCEDO         1,873,790
SOUND REPRODUCING APPARATUS FOR ADVERTISING PURPOSES
Filed Dec. 13, 1929
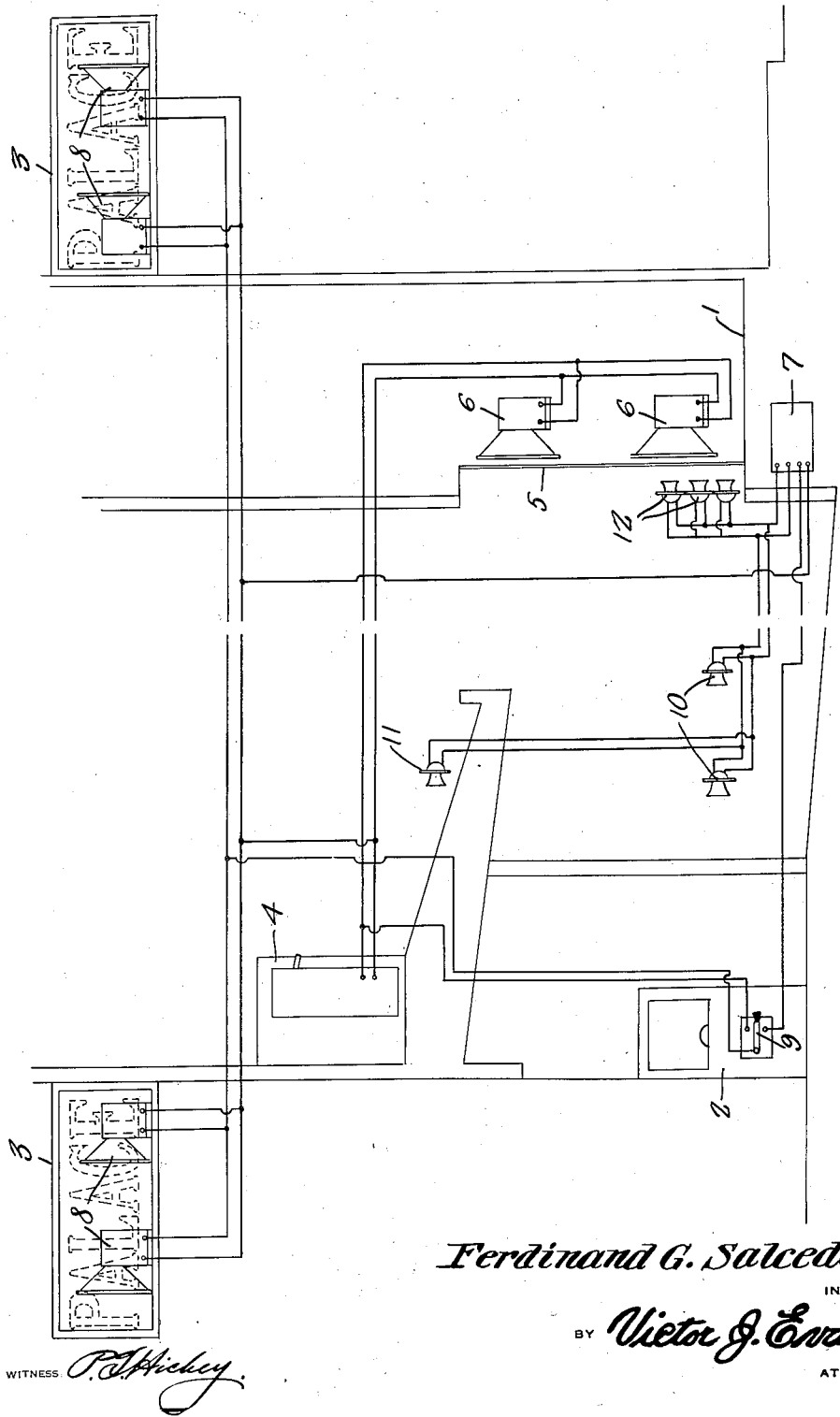
Ferdinand G. Salcedo,
INVENTOR Patented Aug. 23, 1932

1,873,790

UNITED STATES PATENT OFFICE

FERDINAND GEORGE SALCEDO, OF QUANTICO, VIRGINIA

SOUND REPRODUCING APPARATUS FOR ADVERTISING PURPOSES

Application filed December 13, 1929. Serial No. 413,911.

This invention relates to a sound reproducing apparatus for advertising purposes and more particularly to a novel arrangement of a plurality of microphones and loud speakers in combination with the combined sound and motion picture projection apparatus employed in theaters, the purpose of the invention being to supplement or supplant the ordinary pictures which are displayed outside of a motion picture house or theater and which apparatus will attract the attention of pedestrians passing the theater and influence them to enter the theater to observe the pictures attending the reproduction of scenic effects.

Another object of the invention is to so construct the apparatus that it may be controlled, as for example, by the attendant at the ticket office of the theater, so as to transmit the amplified sound waves to pedestrians on the street at such periods in the production of a play as constitutes the culmination of intense human interest or some conspicuous psychological moment in the action of the play, thereby attracting the attention of those passing by the theater and exerting greater influence on them to visit the theater than that obtained by the use of ordinary poster pictures.

Another object of the invention is to provide in an apparatus of the character described above, means whereby, not only the reproduced sound waves incident to the projection of the motion picture may be transmitted and amplified at the exterior of the theater but also the applause, laughter, and other vociferations of the audience, so that passers-by attracted by the tumult raised by the audience will be influenced to gain entrance to the theater and witness the scenes projected on the screen.

Another object of the invention is to provide an apparatus whereby the motion picture houses or theaters constituting a chain, may have announcements made in different ones of the theaters as to the programs being carried out in the other theaters, during intermissions and at the termination of periods of exhibition.

The figure of the accompanying drawing is a diagrammatic view illustrating in a general way, the interior arrangement of a theater or motion picture house as well as the arrangement of parts of the apparatus, which are located exteriorly of the theater or motion picture house.

In the drawing the stage is indicated by the numeral 1 and the ticket office by the numeral 2, and the numeral 3 indicates, for example, signs which are arranged upon the front of the theater and bear the name thereof, and the numeral 4 indicates the motion picture projection house or room in which the combined sound and motion picture projection apparatus, and the operator for controlling the same, is contained or housed, the screen upon which the pictures are projected being indicated by the numeral 5. In addition to the usual amplifiers or loud speakers which are customarily arranged in rear of the screen 5, an amplifier unit 7 comprising a part of my invention is provided.

In carrying out the invention, loud speaker units 8 are located in proximity to the signs 3 or exteriorly of the theater and are in circuit with the usual sound and picture reproduction apparatus located within the projection room 4 of the theater. The circuit is controlled by a switch 9 of any appropriate type conveniently located, such as adjacent the ticket seller in the ticket office 2, whereby the sounds or movietones from the sound and picture reproduction apparatus may be transmitted exteriorly of the theater.

As previously stated, the invention also contemplates an arrangement whereby the applause, cheering or laughter of the audience may be transmitted to the exterior of the theater to attract the attention of and interest passers-by, microphones, indicated by the numeral 10, being preferably arranged at points about the orchestra floor of the theater and one or more microphones 11 in the balcony of the theater and other microphones 12 close to the stage and therefore close to the orchestra, if musicians are employed to render music, in addition to that rendered by the sound and picture reproduction apparatus, and the switch 9 will be so constructed that by manipulating the same these microphones may be brought into circuit with the amplifying unit 7, and with the loud speaker units 8, so that passers-by in the thoroughfare, at which the theater is located, will hear not only the sound waves which are being reproduced and which are in accord with and attend the production of the motion picture, but also the sound waves from the audience and from the orchestra, if the orchestra is playing.

It will be understood of course that the illustration of the drawing is merely representative of one possible arrangement of microphones and amplifying or loud speaker units and that numerous other arrangements may be employed, without departing from the spirit of the invention.

As previously stated, where an apparatus is employed by a chain of theaters, or where any of the principles of the invention may otherwise find embodiment, microphonic and amplifying units may be arranged at the different theaters and electrically coupled in such a manner as to permit transmission from one theater to another.

What I claim is:—

In combination, a theater having a sound and picture reproduction apparatus located therein, loud speaker units located exteriorly of the theater, microphones located within the theater, an amplifier for the microphones, a control switch in the theater, an electrical circuit between the loud speaker units and the sound and picture reproduction apparatus and controlled by the switch, and an electrical circuit between the loud speaker units and the microphones and the amplifier therefor and controlled by said switch whereby either music and applause within the theater or movietones from the sound reproduction apparatus may be transmitted exteriorly of the theater.

In testimony whereof I affix my signature.

FERDINAND GEORGE SALCEDO.